(12) United States Patent
Tsuchiya et al.

(10) Patent No.: US 7,219,386 B2
(45) Date of Patent: May 22, 2007

(54) HOLDING DEVICE AND CLEANING TOOL WITH THE HOLDING DEVICE

(75) Inventors: Akemi Tsuchiya, Kagawa (JP); Yoshinori Tanaka, Kawaga (JP); Masatoshi Fujiwara, Kagawa (JP)

(73) Assignee: Uni-Charm Corporation, Ehime (JP)

( * ) Notice: Subject to any disclaimer, the term of this patent is extended or adjusted under 35 U.S.C. 154(b) by 0 days.

(21) Appl. No.: 11/012,972

(22) Filed: Dec. 14, 2004

(65) Prior Publication Data

US 2005/0097691 A1    May 12, 2005

Related U.S. Application Data

(63) Continuation of application No. PCT/JP03/09159, filed on Jul. 18, 2003.

(30) Foreign Application Priority Data

Jul. 22, 2002   (JP)   ............................. 2002-212756

(51) Int. Cl.
   *B25G 1/04*   (2006.01)
(52) U.S. Cl. ...................... 15/144.4; 15/229.8; 16/429; 403/109.1; 285/302
(58) Field of Classification Search ................ 15/210.1, 15/228, 229.9, 231, 144.3, 144.4, 144.1, 15/229.8; 403/378, 377, 109.1, 109.3, 109.5, 403/109.6; 294/19.1, 19.2, 1.1; 285/302; 16/429

See application file for complete search history.

(56) References Cited

U.S. PATENT DOCUMENTS 2,134,301 A    10/1938   Guggenbuehler

| | | | |
|---|---|---|---|
| 5,305,882 A * | 4/1994 | Kaplan et al. ............... | 206/349 |
| 5,593,196 A * | 1/1997 | Baum et al. ................ | 294/19.1 |
| 6,047,435 A * | 4/2000 | Suzuki et al. ............... | 15/229.8 |
| 6,213,672 B1 | 4/2001 | Varga | |
| 6,371,686 B1 * | 4/2002 | Wu ............................. | 403/377 |
| 2004/0016074 A1 * | 1/2004 | Tanaka ........................ | 15/228 |

FOREIGN PATENT DOCUMENTS

CN    2193304    3/1995

(Continued)

OTHER PUBLICATIONS

CN 2193304-English Translation of the Abstract.
Supplementary European Search Report dated Dec. 28, 2006 issued for corresponding European Patent Application No. 03741483.

*Primary Examiner*—Gladys J P Corcoran
*Assistant Examiner*—Shay L. Karls
(74) *Attorney, Agent, or Firm*—Darby & Darby

(57) ABSTRACT

Disclosed is a holding device including: a telescopic handle having axially opposed front and rear ends and constructed of at least two separate shafts, of which a front-side separate shaft axially fits within a rear-side separate shaft being a hollow cylinder; and a support member provided at the front end of the telescopic handle for attachment of a cleaning wiper. The front-side separate shaft has an axially extending elastic arm and an engaging projection provided at a leading end of the elastic arm, while the rear-side separate shaft has a through-hole passing through a cylinder wall thereof, in which the engaging projection engages when the front-side separate shaft projects from the rear-side separate shaft by a predetermined length. Pressing the engaging projection, which engages in the through-hole, from outside the rear-side separate shaft permits release of the engaging projection from the through-hole.

17 Claims, 10 Drawing Sheets

FOREIGN PATENT DOCUMENTS

| | | |
|---|---|---|
| DE | 3234704 | 3/1984 |
| EP | 0812992 | 12/1997 |
| JP | 50-94037 | 12/1973 |
| JP | 49-147874 | 12/1974 |
| JP | 50-155857 | 12/1975 |
| JP | 51-85273 | 7/1976 |
| JP | 54-116960 | 9/1979 |
| JP | 57-13183 | 1/1982 |
| JP | 09-038009 | 2/1997 |
| JP | 09-154791 | 6/1997 |
| JP | 10-043116 | 2/1998 |
| JP | 10-235574 A | 9/1998 |
| JP | 3057754 | 3/1999 |
| JP | 1-123672 | 5/1999 |
| JP | 2977477 | 9/1999 |
| JP | 2000-46021 | 2/2000 |
| JP | 2000-84501 | 3/2000 |
| JP | 2002-017640 | 1/2002 |

\* cited by examiner

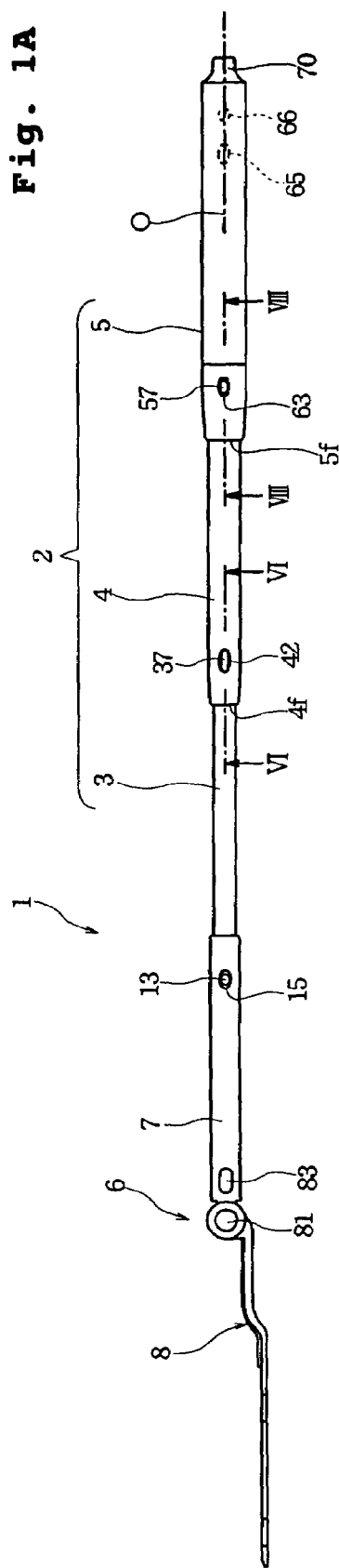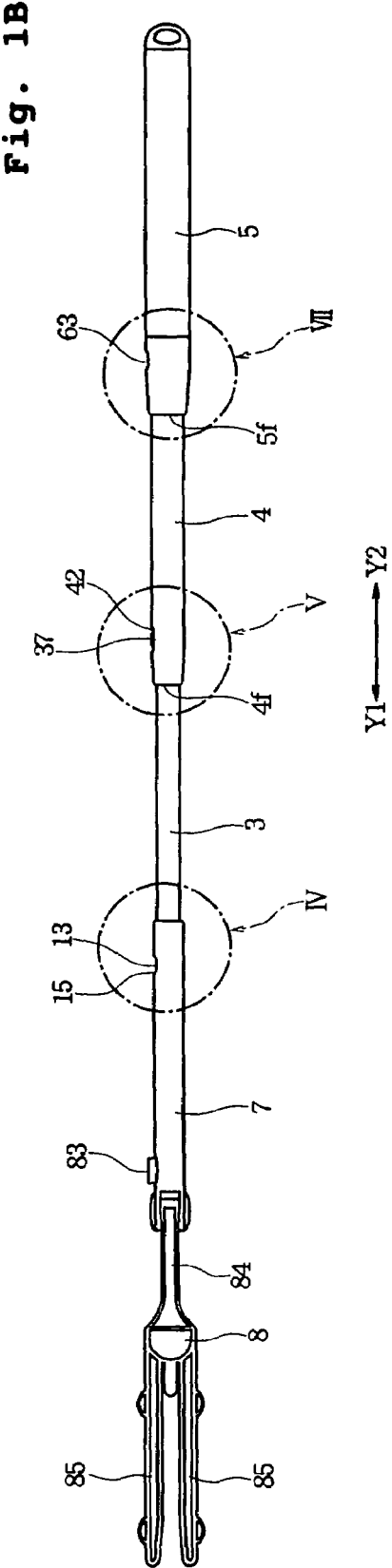

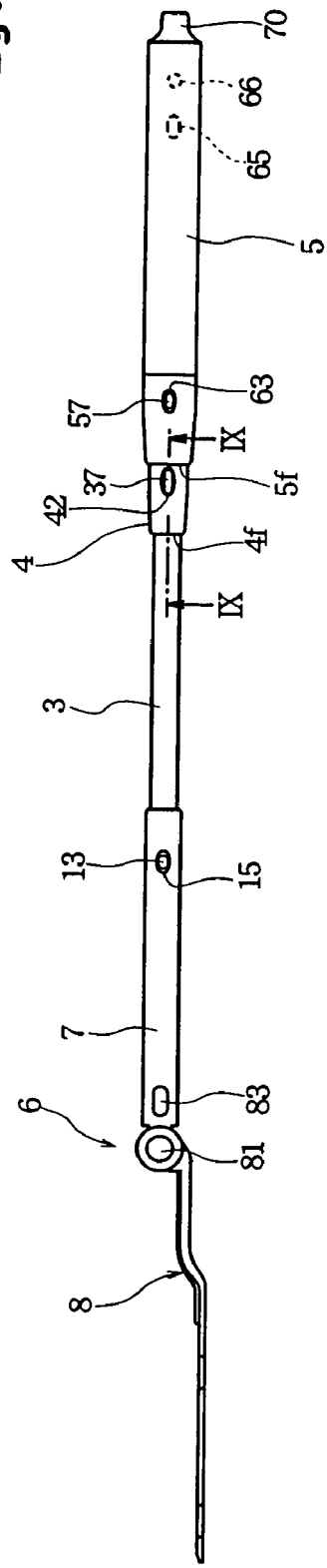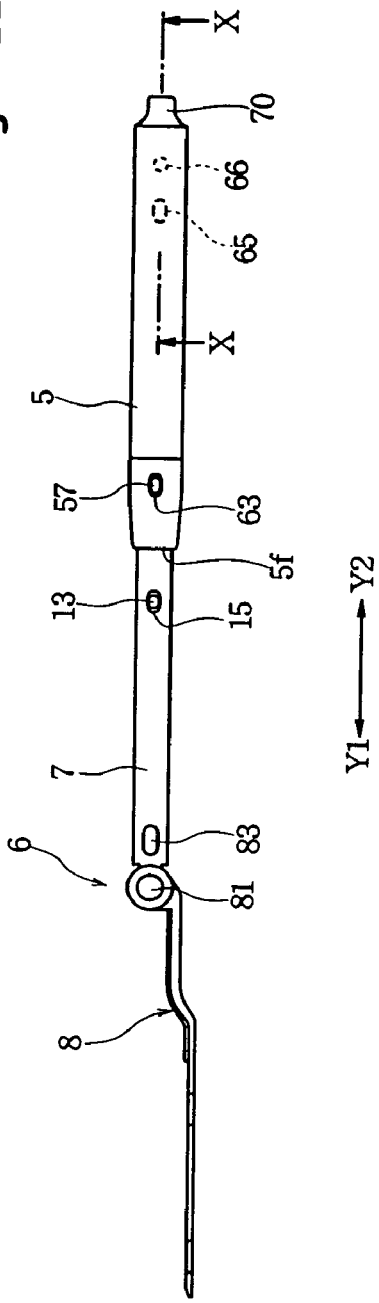

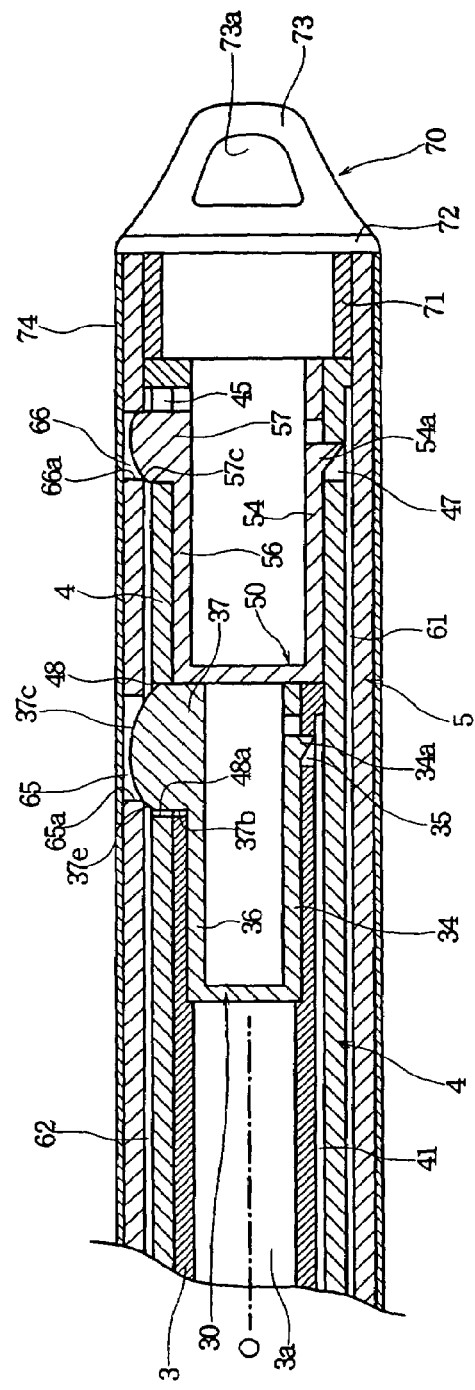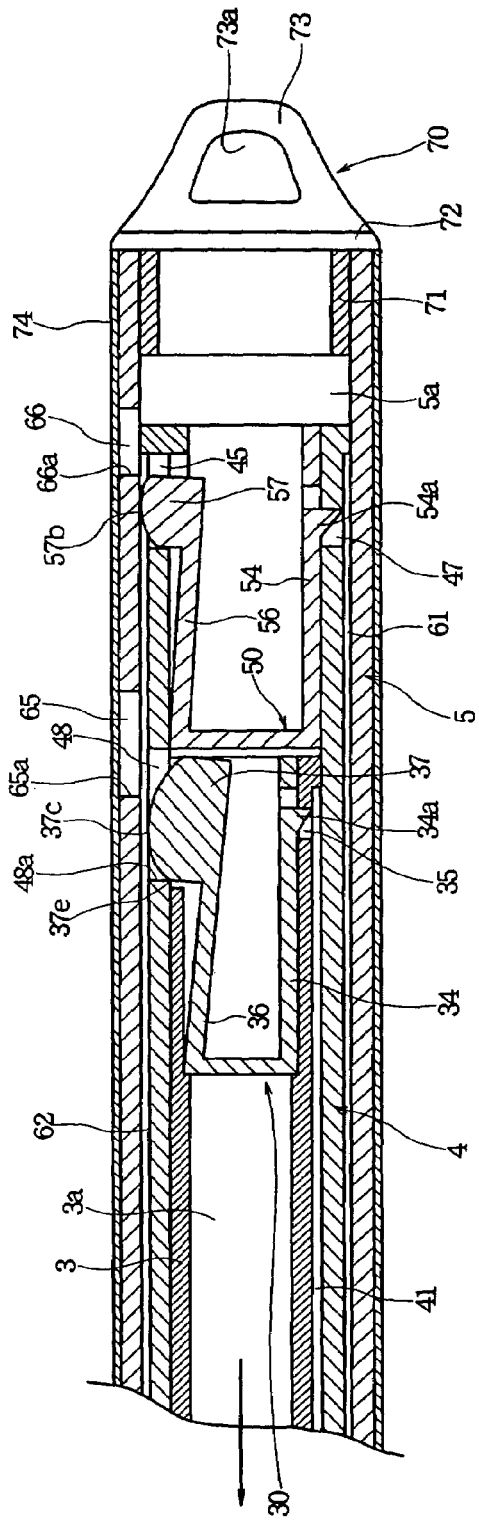

HOLDING DEVICE AND CLEANING TOOL WITH THE HOLDING DEVICE

CROSS-REFERENCE TO RELATED APPLICATIONS

This application is a Continuation of International Patent Application Serial No. PCT/JP2003/09159 filed on Jul. 18, 2003, which claims priority to Japanese Patent Application No. 2002-212756 filed on Jul. 22, 2002, both of which are incorporated by reference herein in their entireties.

BACKGROUND OF THE INVENTION

1. Field of the Invention

The present invention relates to a device for holding a disposable or reusable cleaning wiper and a cleaning tool constructed of the holding device and the cleaning wiper.

2. Description of the Related Art

Japanese Patent Publication No. 2977477 discloses a cleaning tool in which a head is provided at a front end of a short handle that can be held with one hand and a disposable cleaning cloth comprising nonwoven fabric is attached to the head. However, such a short handle cleaning tool is not suitable for floor and ceiling cleaning, although it is suitable for cleaning within reach.

Accordingly, there have been developed cleaning tools in which a cleaning cloth is attached to a front end of a telescopic handle that can be retracted for cleaning within reach and extended for floor and ceiling cleaning. Holding devices using such a telescopic handle are disclosed in Japanese Unexamined Patent Publication Nos. 9-38009 and 9-154791.

In addition, Japanese Unexamined Patent Publication No. 10-43116 discloses a concrete structure of a telescopic handle for the holding device.

This telescopic handle is constructed of a large cylinder, a medium cylinder and a small cylinder, wherein a head for supporting a cleaning cloth is attached to a front end of the small cylinder. The handle can be retracted by accommodating the medium cylinder in the large cylinder and further accommodating the small cylinder in the medium cylinder; conversely, the handle can be extended by pulling the small cylinder out of the medium cylinder and further pulling the medium cylinder out of the large cylinder.

Moreover, length locking means are provided between the small and medium cylinders and between the medium and large cylinders. These length locking means are each constructed of an engaging projection that is provided on an outer periphery of a thinner cylinder at a location closer to a rear end thereof and an engaging groove that is formed inside a thicker cylinder. The engaging projection can be engaged in the engaging groove by axially strongly pulling the cylinder for extension of the handle, while the engagement of the engaging projection in the engaging groove can be forcibly released by applying a strong retracting force between the cylinders.

When the holding device having the length locking means is to be used with the handle extended, accordingly, the engaging projection need be certainly engaged in the engaging groove by forcibly pulling the respective cylinders, wherein if the engagement is unstable during use, the handle may be retracted by a force during cleaning operation. However, since the length locking means are both hidden by the cylinders, visual confirmation of the engaged state from outside is impossible. Therefore, after the small cylinder is pulled out of the medium cylinder, completion of the engagement need be confirmed such as by applying a retracting force between them, and similar confirmation is also required between the medium cylinder and the large cylinder, making the operation complicated.

When the handle is to be retracted, on the other hand, the engagement of the engaging projection in the engaging groove need be released at each length locking means by applying a strong retracting force between the cylinders, so that the strong retracting force need be applied twice for releasing the individual engagements at the two length locking means, making the handle retracting operation complicated, too.

In addition, when a strong retracting force acts on the extended handle during cleaning operation, the engagement at the length locking means may possibly be released, resulting in unexpected retraction of the handle. Particularly if the engaging projection and the engaging groove are worn due to long time use, the engagement at the length locking means becomes unstable, so that the engagement tends to be unexpectedly released during cleaning operation.

SUMMARY OF THE INVENTION

The present invention has been worked out in view of the shortcoming in the prior art set forth above. It is therefore an object of the present invention to provide a holding device, of which a handle can easily be extended and retracted and stably maintained in both extended and retracted positions, and a cleaning tool with the holding device.

According to a first aspect of the present invention, there is provided a holding device for a cleaning wiper comprising:

a telescopic handle having axially opposed front and rear ends and constructed of at least two separate shafts, of which a front-side separate shaft axially fits within a rear-side separate shaft being a hollow cylinder; and a support member provided at the front end of the telescopic handle for attachment of a cleaning wiper, wherein the front-side separate shaft has an axially extending elastic arm and an engaging projection provided at a leading end of the elastic arm, while the rear-side separate shaft has a through-hole passing through a cylinder wall thereof, in which the engaging projection engages when the front-side separate shaft projects from the rear-side separate shaft by a predetermined length, wherein pressing the engaging projection, which engages in the through-hole, from outside the rear-side separate shaft permits release of the engaging projection from the through-hole.

In the holding device, the engaging projection of the front-side separate shaft can fit in the through-hole of the rear-side separate shaft by axially pulling the front-side separate shaft out of the rear-side separate shaft. Thus, the two separate shafts can be firmly engaged to each other in an extended position of the telescopic handle, thereby effectively preventing the telescopic handle from being unexpectedly retracted by a force during cleaning. In order to retract the telescopic handle, on the other hand, the lock can easily be released by pushing the engaging projection, which appears externally from the through-hole, from outside. Here, since the engaging projection is provided on the axially extending elastic arm, the operation to release the engagement by pushing the engaging projection from outside into the through-hole does not require a large force.

The present invention may be constructed such that a locking member integrally formed with the elastic arm and the engaging projection is inserted into the front-side separate shaft from a rear end thereof, and a fitting section for preventing axial displacement of the locking member is provided between the locking member and the front-side separate shaft.

With this construction, the elastic arm and the engaging projection can be attached to the separate shaft only by inserting the locking member into the separate shaft from its rear end. In addition, since the locking member is separate from the separate shaft, the separate shaft can easily be manufactured to be long. Moreover, since another thinner separate shaft can be inserted into the separate shaft with the locking member detached therefrom, assembly operation becomes simple.

The present invention may be constructed such that an axially extending ridge or groove is formed inside the rear-side separate shaft, and an antirotation sliding portion for slidingly engaging the ridge or groove is formed in at least one of the front-side separate shaft and the locking member attached thereto.

With the antirotation sliding portion thus formed in the locking member, the separate shaft can easily be manufactured because there is no need for forming the antirotation sliding portion in the long separate shaft. With the antirotation sliding portion formed in the locking member, moreover, the antirotation sliding portion may be provided near the engaging projection, for instance, allowing greater design freedom for constructing antirotation mechanism. With the antirotation sliding portion formed in the separate shaft, on the other hand, the structure of the locking member can be made simple, so that the locking member can easily be manufactured.

The present invention may be constructed such that the telescopic handle includes a first separate shaft, a second separate shaft and a third separate shaft in front-to-rear order when fully extended, wherein the first and second separate shafts have elastic arms and engaging projections and the second and third separate shafts have through-holes.

When thus constructed of at least three separate shafts, the telescopic handle can be made sufficiently short in a fully retracted position.

The present invention may be constructed such that the engaging projection of the first separate shaft has a slope whose projecting dimension is gradually decreased toward the rear end of the telescopic handle, wherein as the second separate shaft is retracted into the third separate shaft, radial inward displacement of the engaging projection of the first separate shaft due to contact of the slope with a front end of the third separate shaft permits release of the engaging projection of the first separate shaft from the through-hole of the second separate shaft.

With this construction, as the second separate shaft is retracted into the third separate shaft by pushing the first separate shaft toward the third separate shaft, the engagement between the first separate shaft and the second separate shaft can be automatically released at the time when the engaging projection of the first separate shaft comes into contact with the front end of the third separate shaft. Therefore, there is no need for pushing the engaging projection of the first separate shaft by a finger.

In this case, it is preferred that the elastic arm of the first separate shaft has a free end directed toward the rear end of the telescopic handle, and the engaging projection is provided on the free end.

With the free end of the elastic arm of the first separate shaft directed toward the second separate shaft, when the engaging projection comes into contact with the front end of the third separate shaft as set forth above, the slope can move radially inwardly to take the lead, so that the engagement between the first separate shaft and the second separate shaft can be rapidly released. In addition, a force necessary for radially inwardly deforming the elastic arm can be decreased.

The present invention may be constructed such that the second separate shaft has a first hole passing through a cylinder wall thereof, forwardly of the engaging projection of the second separate shaft, and the third separate shaft has second and third holes passing through a cylinder wall thereof and axially spaced apart from each other, rearwardly of the through-hole of the third separate shaft, wherein when the telescopic handle is fully retracted, the first hole is substantially aligned with the second hole so that the engaging projection of the first separate shaft fits in the first hole and faces into the second hole, as well as the engaging projection of the second separate shaft faces into the third hole.

With this construction, since no excess bending external force acts on the elastic arm of the first separate shaft and the elastic arm of the second separate shaft in the fully retracted telescopic handle, the individual elastic arms can be prevented from causing permanent set.

The present invention may be constructed such that when the first separate shaft is pulled forwardly from the fully retracted telescopic handle, the engaging projection of the first separate shaft and the engaging projection of the second separate shaft are released from the second and third holes to permit the second separate shaft to project from the third separate shaft while maintaining the engagement of the engaging projection of the first separate shaft in the first hole, and then, the engaging projection of the first separate shaft is released from the first hole to permit the first separate shaft to project from the second separate shaft.

With this construction, when the support member is pulled forwardly, the second separate shaft first projects and then the first separate shaft projects, so that the telescopic handle can be comfortably operated. It should be noted that the telescopic handle can also be used with only the first separate shaft projecting forwardly.

The present invention may be constructed such that the support member is detachably attached to the front end of the telescopic handle.

If the support member is detachable, the fully retracted telescopic handle and the support member can be compactly housed or stored.

According to a second aspect of the present invention, there is provided a cleaning tool comprising: the foregoing holding device; and a cleaning wiper to be attached to the support member, wherein the cleaning wiper is a disposable wiper comprising nonwoven fabric, paper or a combination of nonwoven fabric and a bundle of fibers, and the cleaning wiper is supported by the support member.

In this construction, since the cleaning wiper can be made soft, it can easily be attached to the support member or replaced.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 1A is a side view and FIG. 1B is a bottom plan view, in which a holding device according to one embodiment of the present invention is illustrated with its telescopic handle fully extended;

FIG. 2A is a side view showing the telescopic handle in a partly retracted position and FIG. 2B is a side view showing the telescopic handle in a fully retracted position;

FIGS. 10A and 10B are fragmentary sectional views taken along line X—X of FIG. 2B, showing locked and unlocked states.

DESCRIPTION OF THE PREFERRED EMBODIMENT

The present invention will be discussed hereinafter in detail in terms of the preferred embodiment according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

FIG. 1A is a side view and FIG. 1B is a bottom plan view, in which a holding device according to one embodiment of the present invention is illustrated with its telescopic handle fully extended; FIG. 2A is a side view showing the telescopic handle in a partly retracted position and FIG. 2B is a side view showing the telescopic handle in a fully retracted position; and FIG. 3 is a perspective view showing a support member of the holding device and a cleaning wiper to be attached thereto.

Figure 4:
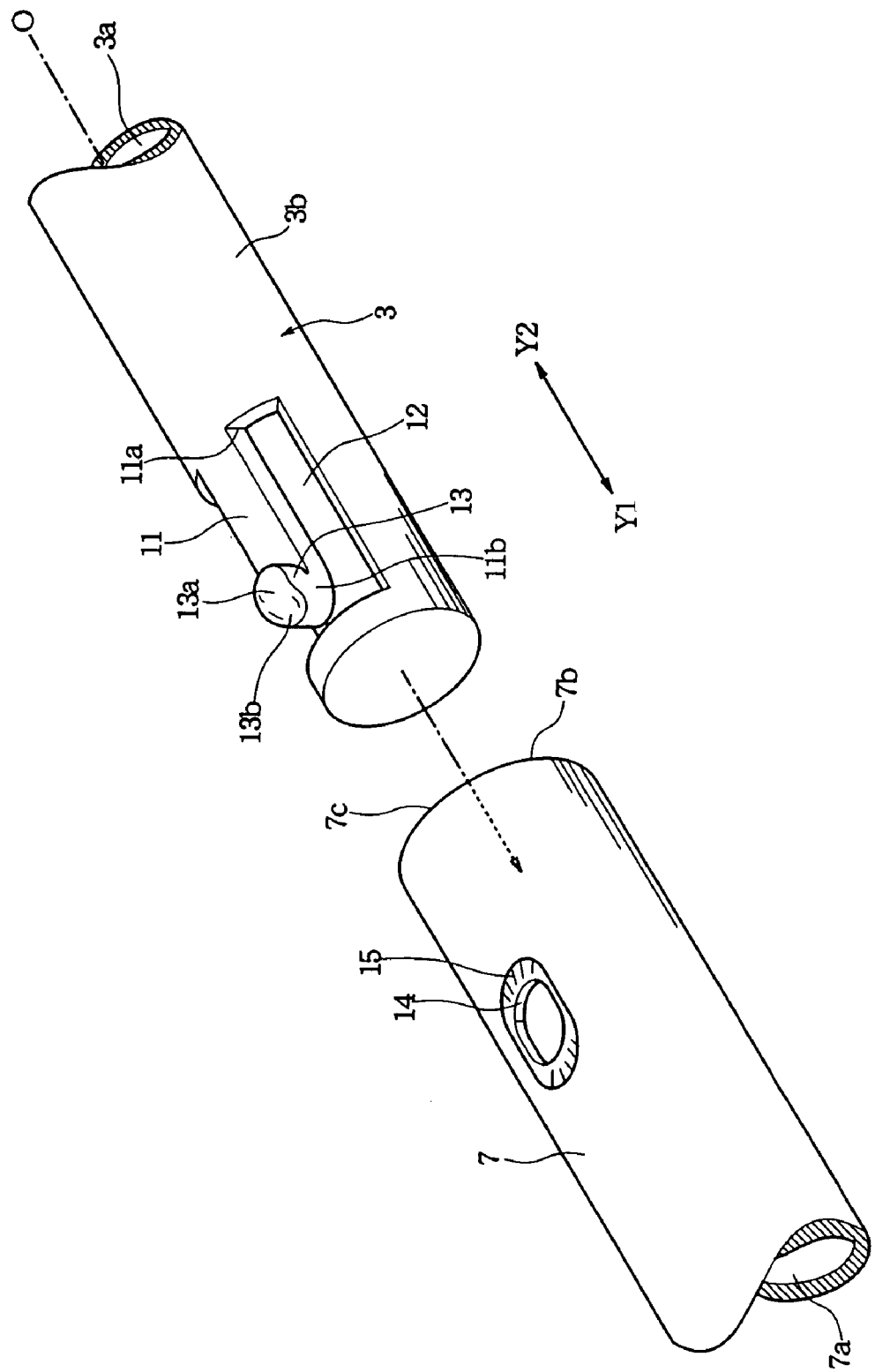
FIG. 4 is an exploded perspective view of a portion indicated by IV in FIG. 1B.
Figure 5:
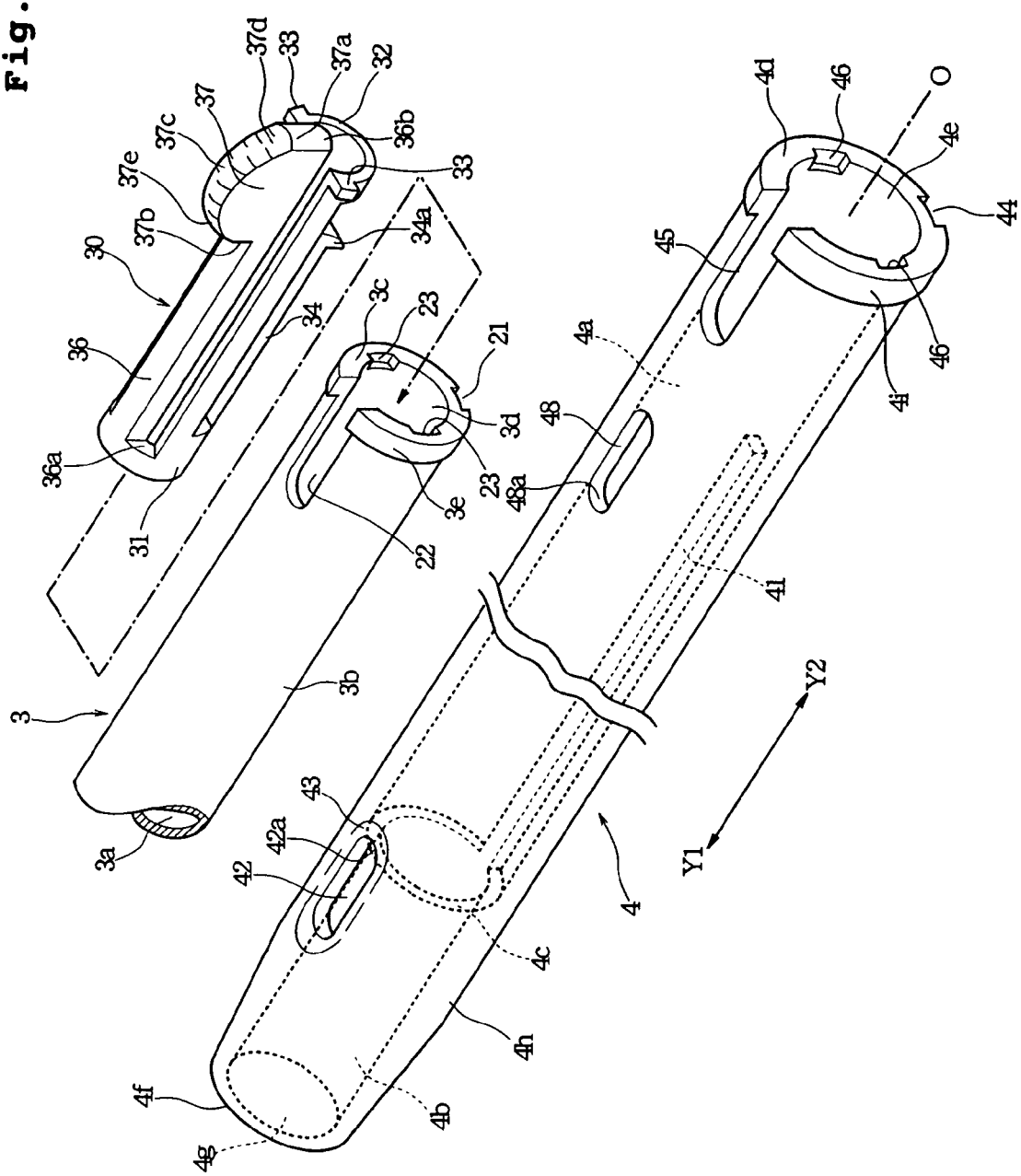
FIG. 5 is an exploded perspective view for describing a portion indicated by V in FIG. 1B.
Figure 6A:
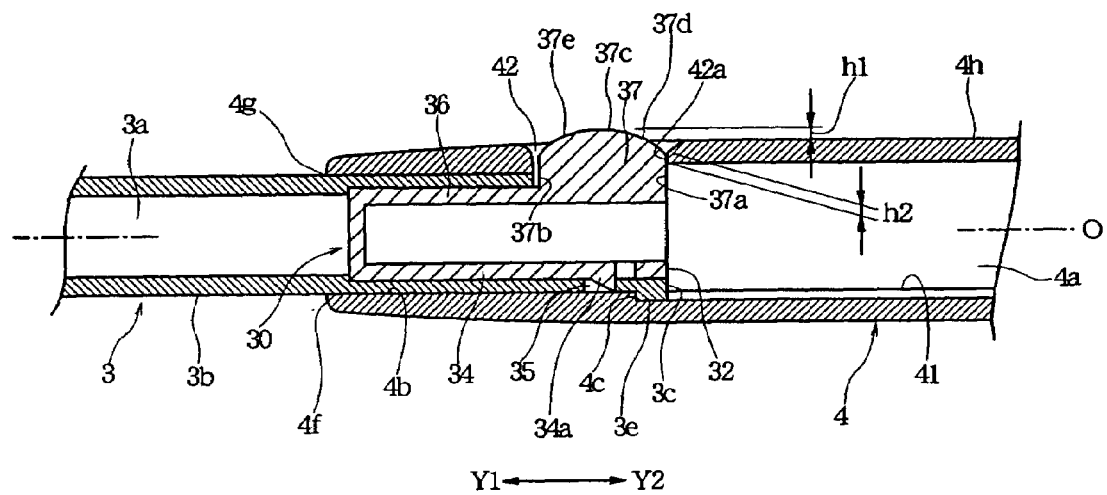
FIGS. 6A and 6B are fragmentary sectional views taken along line VI—VI of FIG. 1A, showing locked and unlocked states.
Figure 6B:
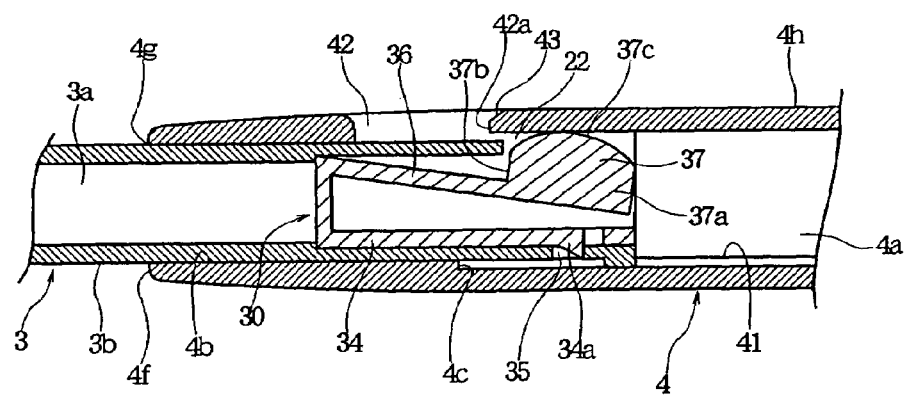
Figure 7:
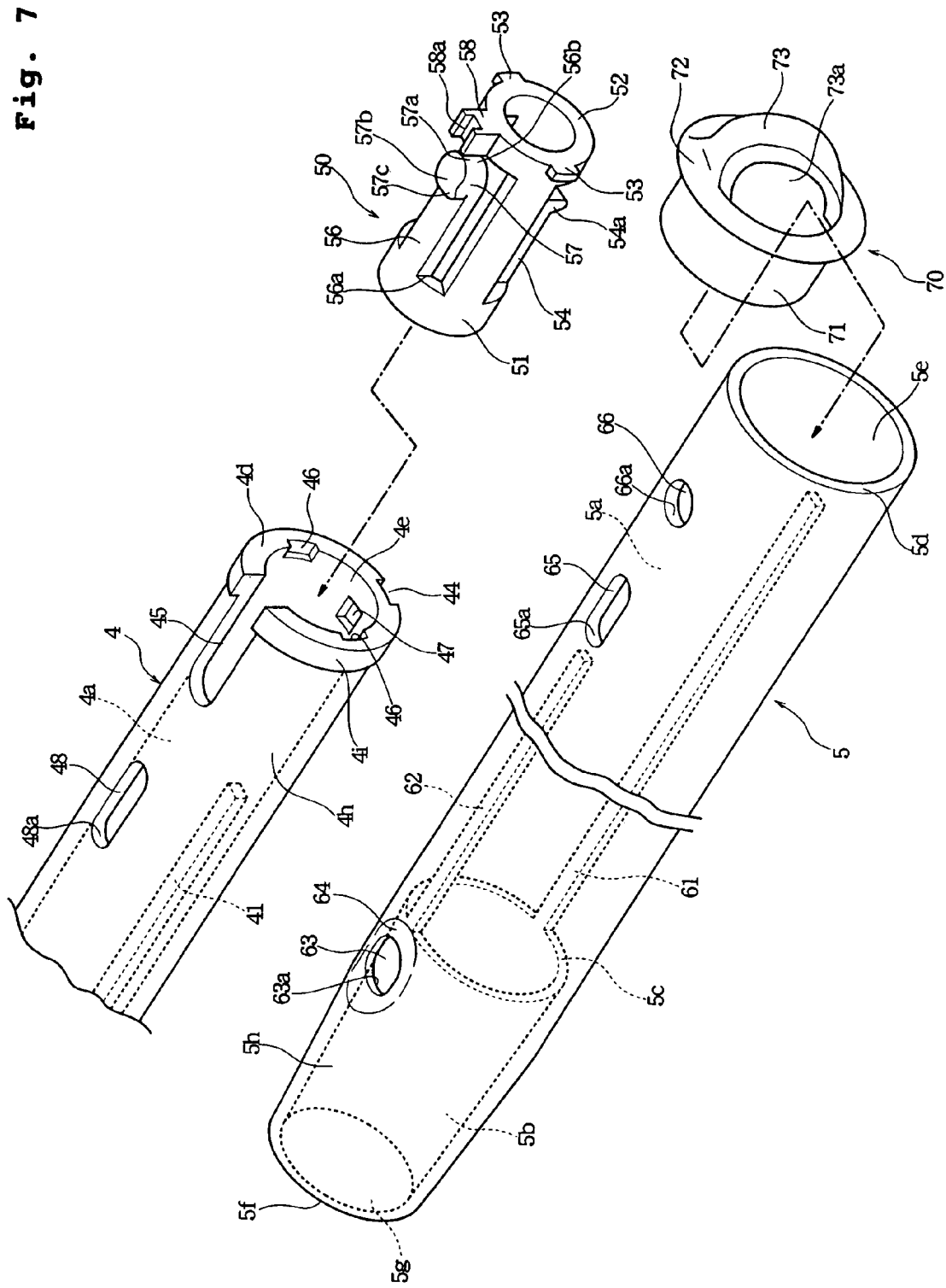
FIG. 7 is an exploded perspective view for describing a portion indicated by VII in FIG. 1B.
Figure 8A:
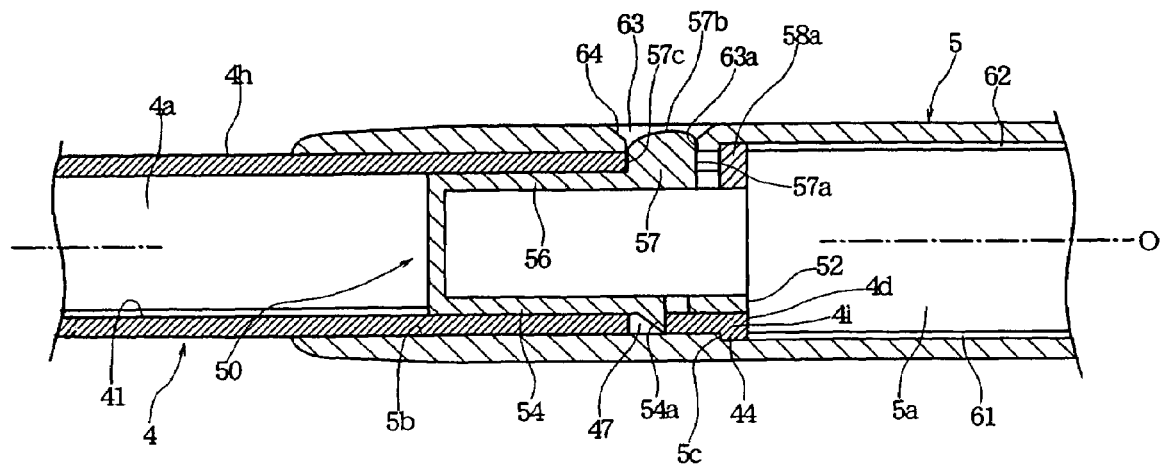
FIGS. 8A and 8B are fragmentary sectional views taken along line VIII—VIII of FIG. 1A, showing locked and unlocked states.
Figure 8B:
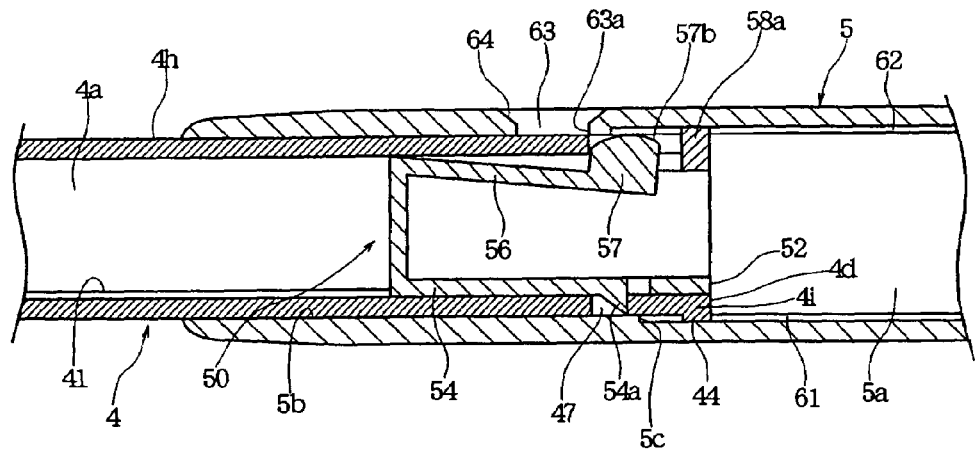
Figure 9A:
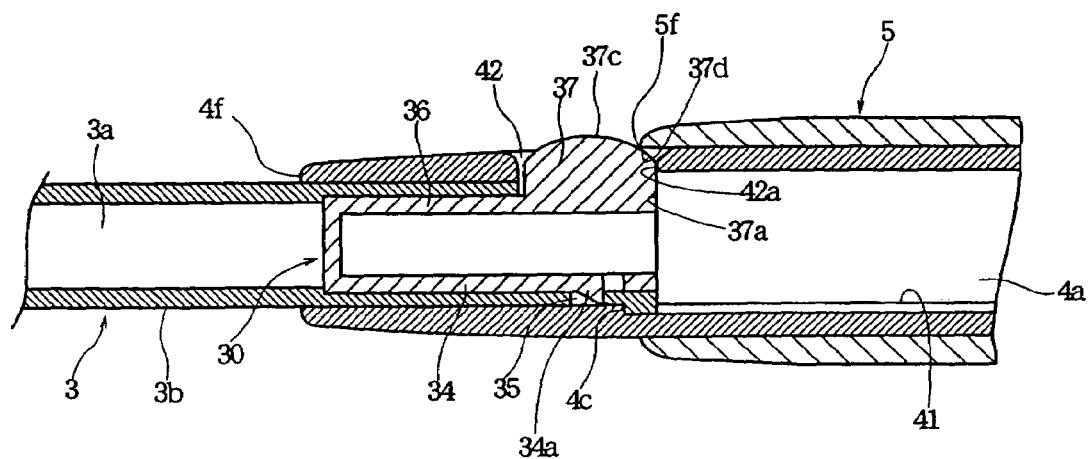
FIGS. 9A and 9B are fragmentary sectional views taken along line IX—IX of FIG. 2A, showing locked and unlocked states.
Figure 9B:
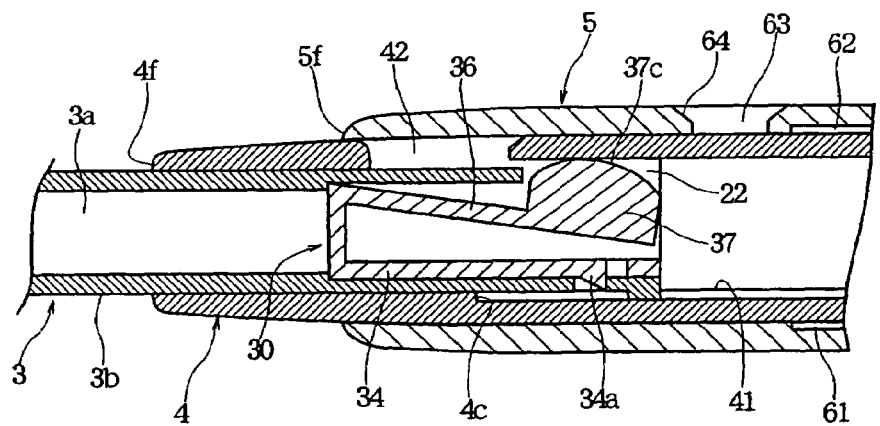

FIG. 4 is an exploded perspective view of a portion indicated by IV in FIG. 1B; FIG. 5 is an exploded perspective view for describing a portion indicated by V in FIG. 1B; FIGS. 6A and 6B are fragmentary sectional views taken along line VI—VI of FIG. 1A, showing locked and unlocked states; FIG. 7 is an exploded perspective view for describing a portion indicated by VII in FIG. 1B; FIGS. 8A and 8B are fragmentary sectional views taken along line VIII—VIII of FIG. 1A, showing locked and unlocked states; FIGS. 9A and 9B are fragmentary sectional views taken along line IX—IX of FIG. 2A, showing locked and unlocked states; and FIGS. 10A and 10B are fragmentary sectional views taken along line X—X of FIG. 2B, showing locked and unlocked states.

Figure 3:
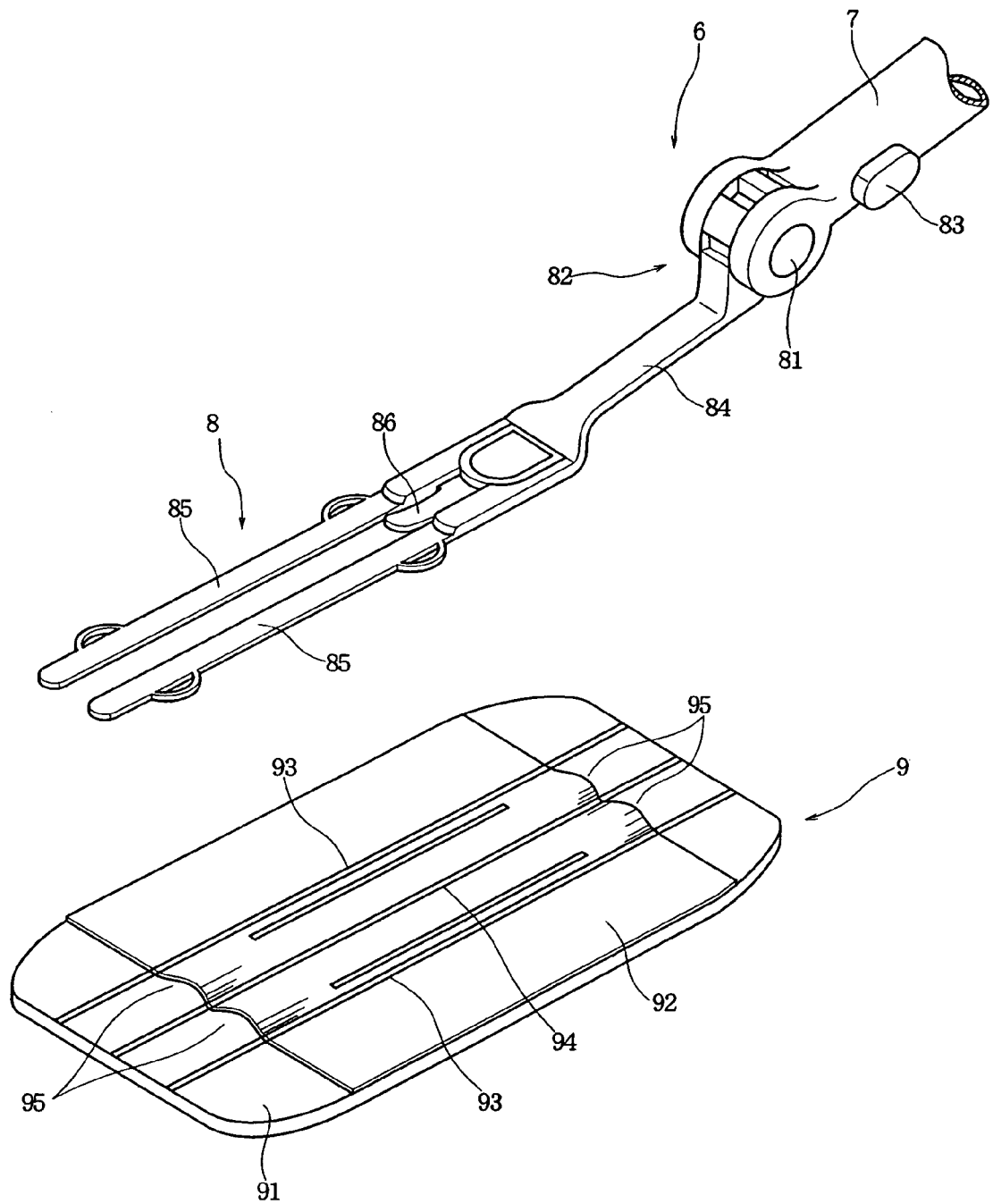
FIG. 3 is a perspective view showing a support member of the holding device and a cleaning wiper to be attached thereto.

In the embodiment shown, a cleaning tool comprises a holding device 1 generally shown in FIGS. 1A, 1B, 2A and 2B and a cleaning wiper 9 shown in FIG. 3. The holding device 1 comprises a telescopic handle 2 constructed of a first separate shaft 3, a second separate shaft 4 and a third separate shaft 5 that fit one within another and a support member 6 attached to a front end of the first separate shaft 3. The support member 6 comprises a support shaft 7 detachably attached to the first separate shaft 3 and a support body 8 pivotally attached to a front end of the support shaft 7.

Individual components constituting the holding device 1 are all made of synthetic resin, such as ABS, vinyl chloride, PE (polyethylene), PP (polypropylene) and PET (polyethylene terephthalate). In an alternative, at least a few of the components may be made of light metal such as aluminum or light alloy such as aluminum alloy.

In the drawings, Y represents the extending direction of a shaft axis O of the telescopic handle 2 and the support shaft 7 in the holding device 1, wherein Y1 represents a front side of the holding device 1 which has the support member 6, while Y2 represents a rear side which has the third separate shaft 5.

FIG. 4 shows a structure of the coupling between the first separate shaft 3 and the support shaft 7 (the portion indicated by IV in FIG. 1B).

The first separate shaft 3 is a hollow cylinder, so that a cylindrical internal space 3a extends axially inside of it. At a location adjacent to its front end, the first separate shaft 3 is integrally formed with an elastic arm 11 that extends forwardly (toward the Y1 side) of the holding device 1. Around the elastic arm 11, a cut-out 12 is formed to communicate with the internal space 3a, thereby separating the elastic arm 11 from the main body portion of the first separate shaft 3. The elastic arm 11 has a supported end 11a on the rear side (Y2 side) and a free end 11b on the front side (Y1 side), wherein the free end 11b is elastically deformable toward the shaft axis O of the telescopic handle 2.

At the free end 11b, the elastic arm 11 is integrally formed with an engaging projection 13 projecting outwardly beyond an outer periphery 3b of the first separate shaft 3. The engaging projection 13 has an outwardly curved end face 13a, wherein the end face 13a has, at its front side, a slope 13b that becomes closer to the shaft axis O as extending toward the Y1 side.

The support shaft 7 is also a hollow cylinder having a cylindrical internal space 7a. The inner diameter of the support shaft 7 (i.e., the diameter of the cylindrical internal space 7a) is such that the first separate shaft 3 can fit tightly within the support shaft 7. At a rear end face 7c of the support shaft 7, an opening 7b is formed to communicate with the internal space 7a. Slightly forwardly of the rear end face 7c, the support shaft 7 has a through-hole 14 passing through the cylinder wall. On the outer periphery, moreover, the support shaft 7 has a depressed portion 15 in which the thickness of the cylinder wall is gradually decreased toward the periphery of the through-hole 14.

When the front end of the first separate shaft 3 is inserted through the opening 7b into the internal space 7a of the support shaft 7, the support shaft 7 first comes into contact, at the periphery of the opening 7b, with the slope 13b of the engaging projection 13. As the first separate shaft 3 is further pushed into the support shaft 7, a reaction force of the pushing force acts on the slope 13b as a component force toward the shaft axis O, so that the elastic arm 11 is deformed with its free end 11b moved toward the shaft axis O. When the engaging projection 13 is aligned with the through-hole 14 by further insertion of the first separate shaft 3 into the support shaft 7, the engaging projection 13 fits within the through-hole 14 by an elastic restoring force of the elastic arm 11, thereby connecting the first separate shaft 3 and the support shaft 7 together.

In order to detach the support shaft 7 from the first separate shaft 3, the end face 13a of the engaging projection 13 that is externally exposed through the through-hole 14 is pushed toward the shaft axis O by a fingertip. As a result, the first separate shaft 3 can be pulled out of the support shaft 7 with the engaging projection 13 released from the through-hole 14. Because the depressed portion 15 is formed around the through-hole 14 on the outer periphery of the support shaft 7, the end face 13a of the engaging projection 13 can be easily pushed by a fingertip, and in addition, the engaging projection 13 can be easily released from the through-hole 14 due to the decreased thickness around the through-hole 14.

FIG. 5 shows a structure of the coupling between the first separate shaft 3 and the second separate shaft 4 (the portion indicated by V in FIG. 1B), wherein the first separate shaft 3 is illustrated only in its rear portion along with a locking member to be attached, while the second separate shaft 4 is illustrated almost as a whole.

At a rear end face 3c of the first separate shaft 3, a circular opening 3d is formed to communicate with the internal space 3a. The first separate shaft 3 has a flange 3e projecting outwardly beyond the outer periphery 3b, within a predetermined range forwardly from the rear end face 3c.

Along its periphery, the flange 3e has an antirotation sliding recess 21 extending along the shaft axis O at a predetermined width. The first separate shaft 3 has a slot 22 extending forwardly from the rear end face 3c, at a location diametrically opposite the antirotation sliding recess 21. The slot 22 passing through the cylinder wall is open-ended at the rear end face 3c. In the rear end face 3c, positioning recesses 23, 23 shallowly recessed toward the Y1 side are formed at locations spaced 90 degrees apart from the antirotation sliding recess 21 and the slot 22.

To the rear portion of the first separate shaft 3, a locking member 30 is attached. The locking member 30 has an outer periphery 31 that is dimensioned to have such an outer diameter as to permit insertion into the internal space 3a of the first separate shaft 3 without play.

Along a rear end face 32 of the locking member 30, two positioning projections 33, 33 are formed to project radially. The width and the thickness in the Y direction of the positioning projections 33, 33 are substantially identical to the opening width and the depth of the positioning recesses 23, 23. When the locking member 30 is inserted through the opening 3d into the internal space 3a, the positioning projections 33, 33 fit in the positioning recesses 23, 23, whereby the locking member 30 is positioned within the first separate shaft 3 without rotation. At this time, the rear end face 32 of the locking member 30 becomes substantially flush with the rear end face 3c of the first separate shaft 3.

The locking member 30 is integrally formed with an elastic arm 34 extending toward the rear side (Y2 side). The elastic arm 34 is integrally formed, at its free end, with an engaging projection (engaging claw) 34a that is directed outwardly. As shown in FIGS. 6A and 6B, the first separate shaft 3 has an engaging hole 35 at a location spaced slightly forwardly apart from the rear end face 3c. When the locking member 30 is inserted through the opening 3d into the internal space 3a, the engaging projection 34a fits in the engaging hole 35, thereby preventing the locking member 30 from slipping out. Here, since the engaging hole 35 is formed to pass through the cylinder wall of the first separate shaft 3, the locking member 30 can be pulled out of the first separate shaft 3 by forcibly pushing the engaging projection 34a, which engages in the engaging hole 35, toward the shaft axis O from outside the first separate shaft 3 to release the fit. In the embodiment shown, the engaging projection 34a and the engaging hole 35 constitute a fitting section for securing the locking member 30 without axial displacement.

The locking member 30 is integrally formed with an elastic arm 36 extending along the shaft axis O, at a location spaced 180 degrees apart from the opposite elastic arm 34. The elastic arm 36 has a supported end 36a on the front side (Y1 side) and a free end 36b on the rear side (Y2 side). At the free end 36b, the elastic arm 36 is integrally formed with an engaging projection 37 projecting outwardly. When the locking member 30 is inserted into the internal space 3a of the first separate shaft 3, the engaging projection 37 is located in the slot 22 to project outwardly beyond the outer periphery 3b of the first separate shaft 3.

As shown in FIG. 5 and FIGS. 6A and 6B, the engaging projection 37 has a first engaging face 37a facing the rear side (Y2 side) and a second engaging face 37b facing the front side (Y1 side), wherein both the first engaging face 37a and the second engaging face 37b are substantially perpendicular to the shaft axis O. The engaging projection 37 also has an outwardly curved end face 37c. As shown in FIG. 6A, the end face 37c has a rear-side slope 37d whose projecting dimension beyond the outer periphery 3b is gradually decreased toward the first engaging face 37a. The end face 37c also has a front-side slope 37e whose projecting dimension is gradually decreased toward the second engaging face 37b.

As shown in FIG. 5, the second separate shaft 4 is a hollow cylinder whose inner diameter is relatively large over a relatively long range from a rear end face 4d toward the front side, thereby forming a large-diameter internal space 4a. At the rear end face 4d, the second separate shaft 4 is formed with a circular opening 4e communicating with the large-diameter internal space 4a. Over a short range from the front end face 4f toward the rear side, the second separate shaft 4 has a small-diameter internal space 4b whose diameter is slightly smaller than that of the large-diameter internal space 4a. At the front end face 4f, formed is a circular opening 4g communicating with the small-diameter internal space 4b.

The diameter of the large-diameter internal space 4a is so set as to permit the flange 3e of the first separate shaft 3 to slide inside of it without play, while the diameter of the small-diameter internal space 4b is so set as to permit the outer periphery 3b of the first separate shaft 3 to slide inside of it without play. Here, a shoulder between the large-diameter internal space 4a and the small-diameter internal space 4b functions as a stopper 4c.

On the inner periphery of the second separate shaft 4 defining the large-diameter internal space 4a, a ridge 41 is integrally formed to extend from the stopper 4c toward the rear side (Y2 side). The ridge 41 is dimensioned to slidingly fit in the antirotation sliding recess 21 formed in the flange 3e of the first separate shaft 3 without play.

In the second separate shaft 4, an elongated through-hole 42 is formed to pass through the cylinder wall and extend over a predetermined range from the vicinity of the stopper 4c toward the front side. The through-hole 42 has an engaging edge 42a on the rear side. On an outer periphery 4h, the second separate shaft 4 has a depressed portion 43 in which the thickness of the cylinder wall is gradually decreased toward the periphery of the through-hole 42.

As shown in FIGS. 6A and 6B, when the first separate shaft 3 combined with the locking member 30 is inserted in the second separate shaft 4 through the opening 4e at the rear end face 4d and the front portion of the first separate shaft 3 projects forwardly from the opening 4g at the front end face 4f of the second separate shaft 4, the outer periphery 3b of the first separate shaft 3 is permitted to slidingly move in the small-diameter internal space 4b, while the flange 3e of the first separate shaft 3 is permitted to slidingly move in the large-diameter internal space 4a of the second separate shaft 4. Here, the antirotation sliding recess 21 formed in the flange 3e slidingly engages the ridge 41, thereby preventing rotation of the first separate shaft 3 inside the second separate shaft 4.

Here, it should be noted that the first separate shaft 3 cannot project any farther forwardly from the second separate shaft 4 when the flange 3e of the forwardly pulled first separate shaft 3 abuts against the stopper 4c, as shown in FIG. 6A.

When the flange 3e abuts against the stopper 4c, the engaging projection 37 of the locking member 30 enters the through-hole 42 formed in the second separate shaft 4. At this time, the end face 37c of the engaging projection 37 projects outwardly beyond the outer periphery 4h of the second separate shaft 4, as shown in FIG. 6A. In addition, the first engaging face 37a of the engaging projection 37 faces the engaging edge 42a of the through-hole 42.

When the first engaging face 37a of the engaging projection 37 faces the engaging edge 42a with the first separate shaft 3 projecting forwardly from the second separate shaft 4, as shown in FIG. 6A, the first separate shaft 3 is engaged (locked) to the second separate shaft 4 so that even when a pressure toward the second separate shaft 4 is axially applied to the first separate shaft 3, the first separate shaft 3 does not enter the second separate shaft 4.

In the engaged state of FIG. 6A, the projecting height h1 of the end face 37c of the engaging projection 37 beyond the outer periphery 4h of the second separate shaft 4 is slightly larger than the height h2 of the portion where the first engaging face 37a faces (engages) the engaging edge 42a. Accordingly, when the engaging projection 37 in the state of FIG. 6A is pushed down to make the end face 37c flush with the outer periphery 4h, the engagement of the first engaging face 37a with the engaging edge 42a is released, so that the rear-side slope 37d faces the engaging edge 42a of the through-hole 42. At this time, if the first separate shaft 3 is axially pushed into the second separate shaft 4, the rear-side slope 37d slides on the engaging edge 42a to move the engaging projection 37 toward the shaft axis O, whereby the elastic arm 36 deforms to bend toward the shaft axis O.

Subsequently, the first separate shaft 3 is accommodated in the second separate shaft 4 with the end face 37c of the engaging projection 37 sliding on the inner periphery of the second separate shaft 4 that defines the large-diameter internal space 4a, as shown in FIG. 6B.

Here, since the elastic arm 36 formed in the locking member 30 has the free end 36b directed toward the rear side (Y2 side), when the end face 37c of the engaging projection 37 is pushed toward the shaft axis O, the first engaging face 37a on the free end moves toward the shaft axis O to take the lead, so that the engagement of the first engaging face 37a with the engaging edge 42a can be rapidly released.

In addition, when the first separate shaft 3 is axially pushed into the second separate shaft 4 from the state where the rear-side slope 37d is in contact with the engaging edge 42a of the through-hole 42, the rear-side slope 37d facing toward the free end can easily move toward the shaft axis O. Accordingly, the first separate shaft 3 can be pushed into the second separate shaft 4 only with a slight pressure.

FIG. 7 shows a structure of the coupling between the second separate shaft 4 and the third separate shaft 5 (the portion indicated by VII in FIG. 1B), wherein the second separate shaft 4 is illustrated only in its rear portion along with a locking member to be attached, while the third separate shaft 5 is illustrated almost as a whole.

As shown in FIGS. 5 and 7, the second separate shaft 4 has a flange 4i projecting outwardly beyond the outer periphery 4h, within a predetermined range from the rear end face 4c toward the front side. Along its periphery, the flange 4i has an antirotation sliding recess 44 extending along the shaft axis O at a predetermined width. The second separate shaft 4 also has a slot 45 extending from the rear end face 4d toward the front side, at a location diametrically opposite the antirotation sliding recess 44. The slot 45 passing through the cylinder wall is open-ended at the rear end face 4d. In the rear end face 4d, positioning recesses 46, 46 shallowly recessed toward the Y1 side are formed at locations spaced 90 degrees apart from the antirotation sliding recess 44 and the slot 45.

To the rear portion of the second separate shaft 4, a locking member 50 is attached. The locking member 50 has an outer periphery 51 that is dimensioned to have such an outer diameter as to permit insertion into the large-diameter internal space 4a of the second separate shaft 4 without play.

Along a rear end face 52 of the locking member 50, two positioning projections 53, 53 are formed to project radially. The width and the thickness in the Y direction of the positioning projections 53, 53 are substantially equal to the width and the depth of the positioning recesses 46, 46. When the locking member 50 is inserted through the opening 4e into the large-diameter internal space 4a, the positioning projections 53, 53 fit in the positioning recesses 46, 46, whereby the locking member 50 is positioned within the second separate shaft 4 without rotation. At this time, the rear end face 52 of the locking member 50 becomes substantially flush with the rear end face 4d of the second separate shaft 4.

In the locking member 50, a projection 58 is integrally formed to project radially along the rear end face 52. The projection 58 has an antirotation sliding recess 58a extending axially at a predetermined width.

The locking member 50 is integrally formed with an elastic arm 54 extending toward the rear side (Y2 side). The elastic arm 54 is integrally formed, at its free end, with an engaging projection (engaging claw) 54a that is directed outwardly. The second separate shaft 4 has an engaging hole 47 at a location spaced slightly forwardly apart from the rear end face 4d. When the locking member 50 is inserted through the opening 4e into the large-diameter internal space 4a, the engaging projection 54a engages in the engaging hole 47, thereby securing the locking member 50 without axial displacement. Here, the locking member 50 can be pulled out of the second separate shaft 4 by forcibly pushing the engaging projection 54a engaging in the engaging hole 47 toward the shaft axis O from outside the second separate shaft 4 to release the engagement between the engaging projection 54a and the engaging hole 47. In the embodiment shown, the engaging projection 54a and the engaging hole 47 constitute a fitting section for securing the locking member 50 without axial displacement.

The locking member 50 is integrally formed with an elastic arm 56 extending along the shaft axis O, at a location diametrically opposite the elastic arm 54. The elastic arm 56 has a supported end 56a on the front side (Y1 side) and a free end 56b on the rear side (Y2 side). At the free end 56b, the elastic arm 56 is integrally formed with an engaging projection 57 projecting outwardly. When the locking member 50 is inserted into the large-diameter internal space 4a of the second separate shaft 4, the engaging projection 57 is located in the slot 45 to project outwardly beyond the outer periphery 4h of the second separate shaft 4.

The engaging projection 57 has an engaging face 57a facing toward the rear side, wherein the engaging face 57a is substantially perpendicular to the shaft axis O. The engaging projection 57 also has an outwardly curved end face 57b, and the end face 57b has a slope 57c whose projecting height beyond the outer periphery 4h is gradually decreased toward the front side (Y1 side).

As shown in FIG. 7, the third separate shaft 5 is a hollow cylinder whose inner diameter is relatively large over a relatively long range from a rear end face 5d toward the front side, thereby forming a large-diameter internal space 5a. At the rear end face 5d, the third separate shaft 5 is formed with a circular opening 5e communicating with the large-diameter internal space 5a. Over a short range from a front end face 5f toward the rear side, the third separate shaft 5 has a small-diameter internal space 5b whose diameter is slightly smaller than that of the large-diameter internal space 5a. At the front end face 5f, formed is a circular opening 5g communicating with the small-diameter internal space 5b.

The diameter of the large-diameter internal space 5a is so set as to permit the flange 4i of the second separate shaft 4 to slide inside of it without play, while the diameter of the small-diameter internal space 5b is so set as to permit the outer periphery 4h of the second separate shaft 4 to slide inside of it without play. Here, a shoulder between the large-diameter internal space 5a and the small-diameter internal space 5b functions as a stopper 5c.

On the inner periphery of the third separate shaft 5 defining the large-diameter internal space 5a, a pair of ridges 61 and 62 are formed in diametrical opposed positions to extend from the stopper 5c toward the rear side (Y2 side). One ridge 61 is dimensioned such that the antirotation sliding recess 44 formed in the flange 4i of the second separate shaft 4 can slide on it without play. The other ridge 62 is dimensioned such that the antirotation sliding recess 58a formed in the locking member 50 can slide on it without play.

In the third separate shaft 5, a through-hole 63 is formed to pass through the cylinder wall on the front side. On an outer periphery 5h, the third separate shaft 5 has a depressed portion 64 in which the thickness of the cylinder wall is gradually decreased toward the periphery of the through-hole 63. The through-hole 63 has an engaging edge 63a on the rear side.

When the second separate shaft 4 combined with the locking member 50 is inserted in the third separate shaft 5 through the opening 5e at the rear end face 5d, the front portion of the second separate shaft 4 projects forwardly from the opening 5g at the front end face 5f of the third separate shaft 5, as shown in FIGS. 8A and 8B, and in such a state, the flange 4i of the second separate shaft 4 is permitted to slidingly move in the large-diameter internal space 5a of the third separate shaft 5, while the outer periphery 4h of the second separate shaft 4 is permitted to slidingly move in the small-diameter internal space 5b.

Here, the ridge 61 slidingly fits in the antirotation sliding recess 44 formed in the flange 4i, while the ridge 62 slidingly fits in the antirotation sliding recess 58a formed in the locking member 50. Due to the two ridges 61, 62 and the antirotation sliding recesses 44, 58a, the second separate shaft 4 can be axially slidingly accommodated in the third separate shaft 5 without rotation.

Here, it should be noted that the second separate shaft 4 cannot project any farther forwardly from the third separate shaft 5 when the flange 4i abuts against the stopper 5c, as shown in FIG. 8A.

In the state of FIG. 8A, the engaging projection 57 formed in the locking member 50 enters the through-hole 63 formed in the third separate shaft 5. At this time, the end face 57b of the engaging projection 57 is exposed through the through-hole 63. In addition, the engaging face 57a of the engaging projection 57 faces the engaging edge 63a of the through-hole 63.

When the second separate shaft 4 projects farthest forwardly from the third separate shaft 5 with the engaging face 57a of the engaging projection 57 facing the engaging edge 63a of the through-hole 63, as shown in FIG. 8A, the second separate shaft 4 is engaged (locked) so as not to axially move toward the inside of the third separate shaft 5.

In order to release the engagement between the second separate shaft 4 and the third separate shaft 5, the engaging face 57a is moved away from the engaging edge 63a by pushing the end face 57b of the engaging projection 57 toward the shaft axis O with a fingertip or the like. As a result, the engagement by the engaging projection 57 is released, and the second separate shaft 4 can be axially accommodated in the third separate shaft 5, as shown in FIG. 8B. At this time, the end face 57b of the engaging projection 57 slides on the ridge 62 formed on the inner periphery of the third separate shaft 5 that defines the large-diameter internal space 5a.

At the rear end face 5d, as shown in FIG. 7, a cap 70 fits in the third separate shaft 5. The cap 70 has a closing cylinder 71 to be pressed into the large-diameter internal space 5a through the opening 5e of the third separate shaft 5 and a cover 72 behind it. The cover 72 includes a hang member 73 defining a hang hole 73a. By handing the hang member 73 on a hook secured on the house wall or the like, the holding device 1 can be suspended.

As shown in FIGS. 5 and 7, the second separate shaft 4 has a first hole 48 passing through the cylinder wall at a location spaced slightly forwardly apart from the slot 45. The first hole 48 is a slot elongated axially to have an engaging edge 48a on the front side.

On the rear side of the third separate shaft 5, on the other hand, a second hole 65 and a third hole 66, which is closer to the rear end face 5d than the second hole 65, are formed to pass through the cylinder wall. The second hole 65 is an axially elongated slot, and its axial opening dimension is slightly smaller than that of the first hole 48. On the other hand, the third hole 66 is substantially circular. Here, the second hole 65 has an engaging edge 65a on the front side, and the third hole 66 also has an engaging edge 66a on the front side.

FIG. 10A is a sectional view taken along line X—X of FIG. 2B, showing the telescopic handle 2 in a fully retracted position.

In this position, the second separate shaft 4 is fully pushed into the third separate shaft 5 toward the rear side. And, the engaging projection 57 formed in the locking member 50 enters the third hole 66. Here, the slope 57c of the end face 57b of the engaging projection 57 faces the engaging edge 66a of the third hole 66. Accordingly, when a pulling force is applied forwardly to the second separate shaft 4 in this state, the slope 57 slides on the engaging edge 66a to deform the elastic arm 56 toward the shaft axis O, so that the engaging projection 57 comes out of the third hole 66 and the end face 57b of the engaging projection 57 slidingly contacts the inner periphery of the third separate shaft 5, as shown in FIG. 10B.

In FIG. 10A, moreover, the first separate shaft 3 is fully pushed into the second separate shaft 4 toward the rear side. Here, the first hole 48 formed in the second separate shaft 4 faces the second hole 65 formed in the third separate shaft 5. Accordingly, the engaging projection 37 formed in the locking member 30 fits in the first hole 48 and faces into the second hole 65. At this time, the engaging edge 65a of the second hole 65 faces the front-side slope 37e of the end face 37c of the engaging projection 37.

When the support member 6 or the first separate shaft 3 is forwardly pulled from the state of FIG. 10A, the engaging projection 57 provided in the second separate shaft 4 comes out of the third hole 66 to permit forward movement of the second separate shaft 4 within the third separate shaft 5, as set forth above. At the beginning of the movement, the front-side slope 37e of the engaging projection 37 provided in the first separate shaft 3 is pushed toward the shaft axis O by the engaging edge 65a of the second hole 65. Accordingly, the engaging projection 37 comes out of the second hole 65 to bring the end face 37c into sliding contact with the ridge 62 formed on the inner periphery of the third separate shaft 5, as shown in FIG. 10B. In the state of FIG. 10B, moreover, the engaging edge 48a of the first hole 48 of the second separate shaft 4 comes into contact with the front-side slope 37e of the engaging projection 37, so that the second separate shaft 4 is lightly locked to the first separate shaft 3.

Thus, the first separate shaft 3 and the second separate shaft 4 locked to each other with the engaging projection 37 slidingly move together forwardly within the third separate shaft 5. Therefore, the second separate shaft 4 projects from the third separate shaft 5 prior to protrusion of the first separate shaft 3 from the second separate shaft 4.

When a pulling force is further applied forwardly to the first separate shaft 3 after the protrusion of the second separate shaft 4 from the third separate shaft 5, then, the front-side slope 37e of the engaging projection 37 slides on the engaging edge 48a of the first hole 48 formed in the second separate shaft 4, so that the engaging projection 37 comes out of the first hole 48 and the first separate shaft 3 slidingly projects from the second separate shaft 4.

Thus, after the preceding protrusion of the second separate shaft 4 from the third separate shaft 5, the first separate shaft 3 can consecutively project from the second separate shaft 4. After the first separate shaft 3 projects from the second separate shaft 4, then, the first separate shaft 3 and the second separate shaft 4 are locked to each other through the engaging projection 37.

It should be noted that in the state of FIG. 10A, neither the engaging projection 37 facing into the second hole 65 nor the engaging projection 57 located in the third hole 66 projects beyond the outer periphery 5h of the third separate shaft 5. Accordingly, the outer periphery of the third separate shaft 5 may be covered with a cover tube 74 and/or a tape having a pressure-sensitive adhesive layer to close the second hole 65 and the third hole 66. By closing the holes 65, 66 as set forth above, the holes 65, 66 become invisible from outside to thereby improve the appearance.

In the support member 6, as shown in FIG. 3, the support body 8 is pivotally connected to the front end of the support shaft 7 through a pivot connection 81. Adjacent the pivot connection 81, a locking mechanism 82 is provided inside the support shaft 7. This locking mechanism 82 can lock the support body 8 at a variety of pivot angles. In addition, the support shaft 7 has an operating button 83, on its one side, for releasing the lock due to the locking mechanism 82.

The support body 8 has an arm 84 extending forwardly from the pivot connection 81, and the arm 84 is bifurcated to provide support strips 85, 85 in the form of parallel flat plates. At the bifurcation point between the support strips 85, 85, a clip 86 is integrally formed to extend forwardly between the support strips 85, 85.

The cleaning wiper 9 of FIG. 3 is a disposable, soft wiper, of which a main body 91 comprises a nonwoven fabric, a stack of nonwoven fabrics, a stack of papers, a foamed resin material, a stack of a nonwoven fabric and a bundle of fibers that is referred to as tow, or the like. On the main body 91, laid is a holding sheet 92 that comprises a nonwoven fabric or the like. The main body 91 and the holding sheet 92 are joined together at a pair of longitudinally extending side bond lines 93, 93 and a center bond line 94 extending parallel with and between the two side bond lines 93, 93.

Between the main body 91 and the holding sheet 92, there are formed holding spaces 95, 95 individually defined between one side bond line 93 and the center bond line 94. When the support strips 85, 85 of the support body 8 are inserted into the holding spaces 95, 95, the upper surface of the holding sheet 92 is pressed by the clip 86, whereby the cleaning wiper 9 attached to the support body 8 can be prevented from easily detaching therefrom.

The holding device 1 can easily be assembled as follows:

First, the first separate shaft 3 is inserted through the opening 4e into the second separate shaft 4 with the locking member 30 attached to the rear end of the first separate shaft 3 so that the front portion of the first separate shaft 3 projects forwardly from the opening 4g. After the insertion of the first separate shaft 3, the locking member 50 is attached to the opening 4e of the second separate shaft 4. Then, the second separate shaft 4 accommodating the first separate shaft 3 is inserted through the opening 5e into the third separate shaft 5 so that the front portion of the second separate shaft 4 projects forwardly from the opening 5g. Thereafter, the cap 70 is engaged in the opening 5e. Moreover, the support shaft 7 of the support member 6 is fittingly attached to the front end of the first separate shaft 3 through the coupling structure of FIG. 4.

Next, the telescopic motion of the holding device 1 will be described.

FIGS. 1A and 1B show the telescopic handle 2 in a fully extended position, wherein the engaging projection 37 of the locking member 30 attached to the first separate shaft 3 is fittingly engaged (locked) to the through-hole 42 of the second separate shaft 4, as shown in FIG. 6A, while the engaging projection 57 of the locking member 50 attached to the second separate shaft 4 is fittingly engaged (locked) to the through-hole 63 of the third separate shaft 5, as shown in FIG. 8A.

In this state, dust or dirt out of reach can be wiped off with the cleaning wiper 9 attached to the support body 8 of the support member 6.

In order to retract the telescopic handle 2 from the state of FIGS. 1A and 1B to the state of FIG. 2B, the engaging projection 57, which fits in the through-hole 63 formed in the third separate shaft 5 as shown in FIG. 8A, is first pushed by a finger. This releases the engagement between the second separate shaft 4 and the third separate shaft 5. By pushing the support shaft 7 of the support member 6 or the first separate shaft 3 toward the rear side, then, the second separate shaft 4 is retracted into the third separate shaft 5 while the first separate shaft 3 and the second separate shaft 4 remain engaged through the engaging projection 37, wherein the end face 57b of the engaging projection 57 slides on the ridge 62 of the third separate shaft 5, as shown in FIG. 8B.

Immediately before completion of the retracting motion, the rear-side slope 37d of the engaging projection 37 projecting beyond the outer periphery 4h of the second separate shaft 4 abuts against the front end face 5f of the third separate shaft 5, as shown in FIGS. 2A and 9A. Therefore, if the first separate shaft 3 is continuously pushed toward the third separate shaft 5, the end face 37c of the engaging projection 37 is pushed down to the inner periphery of the third separate shaft 5 with the rear-side slope 37d being pressed by the front end face 5f. At this time, the engaging projection 37 is pushed down by the height H1 of FIG. 6A, which is larger than the height h2 of the portion where the first engaging face 37a of the engaging projection 37 engages the engaging edge 42a of the through-hole 42. Therefore, when the first separate shaft 3 is pushed toward the rear side from the state of FIG. 9A, the engagement between the first engaging face 37a and the engaging edge 42a is automatically released, so that the first separate shaft 3 is permitted to slide axially within the second separate shaft 4, as shown in FIG. 6B.

That is, the telescopic handle 2 can be changed from the fully extended position of FIGS. 1A and 1B to the fully retracted position of FIG. 2B only with a rearward force kept applied to the support shaft 7 or the first separate shaft 3 even after the engagement between the second separate shaft 4 and the third separate shaft 5 is released by pushing the engaging projection 57.

When the telescopic handle 2 constructed of the first separate shaft 3, the second separate shaft 4 and the third separate shaft 5 is fully retracted, the engaging projection 57 provided at the rear portion of the second separate shaft 4 is engaged in and lightly locked to the third hole 66 of the third separate shaft 5, as shown in the X—X sectional view of FIG. 10A. On the other hand, the engaging projection 37 provided at the rear portion of the first separate shaft 3 is engaged in and locked to the first hole 48 formed in the second separate shaft 4, as well as faces into the second hole 65 formed in the third separate shaft 5.

Thus, when the telescopic handle 2 is fully retracted, the second separate shaft 4 is lightly locked in the third separate shaft 5, while the first separate shaft 3 is locked in the second separate shaft 4, thereby maintaining the fully retracted position of the telescopic handle 2. At this time, since no external force is acting on the elastic arm 36 having the engaging projection 37 and the elastic arm 56 having the engaging projection 57 to deform them much toward the shaft axis O, as shown in FIG. 10A, neither deformation of the elastic arms 36 and 56 nor decrease of elasticity will be caused by long-time storage of the telescopic handle 2 in the fully retracted position.

By holding and pulling the support shaft 7 or the first separate shaft 3 toward the front side (Y1 side) from the state of FIG. 2B, the engagement between the engaging projection 57 and third hole 66 is released, so that the second separate shaft 4 can move toward the Y1 side, as shown in FIG. 10B. Then, after the second separate shaft 4 having projected from the third separate shaft 5 is locked to the third separate shaft 5 with the engaging projection 57, the first separate shaft 3 is permitted to project forwardly from the second separate shaft 4. Thereafter, the first separate shaft 3 and the second separate shaft 4 are engaged to each other with the engaging projection 37.

Although the preferred embodiment of the present invention has been described in detail with reference to the accompanying drawings, it should be understood by those skilled in the art that various changes, omission and additions may be made therein and thereto, without departing from the spirit and scope of the present invention.

For instance, although the antirotation sliding recess 44 is formed in the second separate shaft 4 and the antirotation sliding recess 58a is formed in the locking member 50 in FIG. 7, the antirotation sliding recess 44 may be formed in the locking member 50 and the antirotation sliding recess 58a be formed in the second separate shaft 4. In an alternative, only one of the antirotation sliding recesses 44 and 58a may be provided. In FIG. 5, on the other hand, the antirotation sliding recess 21 may be formed in the locking member 30 or both the first separate shaft 3 and the locking member 30 may have antirotation sliding recesses.

It should be noted that the axially extending ridge 41 is formed inside the second separate shaft 4, as shown in FIG. 5, and the axially extending ridges 61 and 62 are also formed inside the third separate shaft 5, as shown in FIG. 7, but at least one of them may be axially extending groove, in place of ridge. In this case, the antirotation sliding recesses 21, 44, 58a are replaced by antirotation sliding projections for slidingly moving within the grooves.

It should also be noted that the rear-side slope 37d and the front-side slope 37e formed in the engaging projection 37 may be straight slopes instead of curved slopes. This is true for the slope 57c of the engaging projection 57.

In the present invention, as has been described hereinabove, the telescopic handle can be stabilized in both extended and retracted positions, and in addition, both extending and retracting operations of the handle can easily be performed.

The present invention should not be understood as limited to the specific embodiment set out above but to include all possible embodiments which can be embodied within a scope encompassed and equivalent thereof with respect to the feature set out in the appended claims.

What is claimed is:

1. A holding device for a cleaning wiper comprising:
a telescopic handle having axially opposed front and rear ends; and
a support member provided at the front end of the telescopic handle for attachment of a cleaning wiper, the telescopic handle being constructed of a first separate shaft, a second separate shaft and a third separate shaft in front-to-rear order when the telescopic handle is fully extended, the individual separate shafts being a hollow cylinder, the first separate shaft being adapted to axially fit within the second separate shaft, the second shaft being adapted to axially fit within the third separate shaft, the first and second separate shafts having axially extending elastic arms and engaging projections at leading ends of the elastic arms, the engaging projection of the first separate shaft having a slope whose projecting dimension gradually decreases toward the rear end of the telescopic handle, the second and third separate shafts having through-holes which pass through a cylinder wall thereof and in which the engaging projections of the first and second separate shafts engage, respectively, when the telescopic handle is fully extended,
wherein pressing the engaging projection of the second separate shaft, which engages in the through-hole of the third separate shaft, from outside the third separate shaft permits release of the engaging projection of the second separate shaft from the through-hole of the third separate shaft for retraction of the second separate shaft into the third separate shaft, and wherein the projecting dimension of the slope of the engaging projection of the first separate shaft which engages the through-hole of the second separate shaft gradually decreases toward at an edge of the engaging projection of the first separate shaft that is located against an engaging edge of the through-hole of the second separate shaft, such that the projecting dimension at the edge of the engaging projection of the first separate shaft lies along the engaging edge and within the through hole of the second separate shaft when the engaging projection of the first separate shaft engages the through hole of the second separate shaft, and as the second separate shaft is retracted into the third separate shaft, the engaging projection of the first separate shaft is displaced radially inwardly by contact of the slope with a front end of the third separate shaft, causing the edge of the engaging projection of the first separate shaft to fall below the engaging edge in the through-hole of the second separate shaft, and allowing the engaging projection of the first separate shaft to be further radially inwardly displaced by contact of the slope with the engaging edge of the through hole of the second separate shaft to come out of the through-hole of the second separate shaft without the need of pressing the engaging projection of the first separate shaft with a finger.

2. A holding device as set forth in claim 1, wherein among the first, second, and third separate shafts, a locking member integrally formed with the elastic arm and the engaging projection is inserted into the front-side separate shaft from a rear end thereof, and a fitting section for preventing axial displacement of the locking member is provided between the locking member and the front-side separate shaft.

3. A holding device as set forth in claim 2, wherein among the first, second and third separate shafts, an axially extending ridge or groove is formed inside the rear-side separate shaft, and an antirotation sliding portion for slidingly engaging the ridge or groove is formed in at least one of the front-side separate shaft and the locking member attached thereto.

4. A holding device as set forth in claim 1, wherein the elastic arm of the first separate shaft has a free end directed toward the rear end of the telescopic handle, and the engaging projection is provided on the free end.

5. A holding device as set forth in claim 1, wherein the support member is detachably attached to the front end of the telescopic handle.

6. A cleaning tool comprising:
the holding device of claim 1; and
a cleaning wiper to be attached to the support member, wherein
the cleaning wiper is a disposable wiper comprising at least one of nonwoven fabric, paper, and a bundle of fibers, and the cleaning wiper is supported by the support member.

7. A holding device as set forth in claim 1, wherein the engaging projection of the second separate shaft is adapted to be pressed with a finger.

8. A holding device as set forth in claim 1, wherein when the first separate shaft is pulled forwardly from the fully retracted telescopic handle, the engaging projection of the first separate shaft remains engaging in a first hole of the second separate shaft until the engaging projection of the second separate shaft engages in the through-hole of the third separate shaft, the first hole being located between the through-hole and the engaging projection of the second separate shaft and passing through a cylinder wall thereof.

9. A holding device as set forth in claim 8, wherein the third separate shaft has another hole rearward of the through-hole, wherein when the telescopic handle is fully retracted, the engaging projection of the second separate shaft enters the another hole, and when the first separate shaft is pulled forwardly from the fully retracted telescopic handle, the engaging projection of the second separate shaft is released from the another hole while the engaging projection of the first separate shaft remains engaging in the first hole of the second separate shaft.

10. A holding device as set forth in claim 1, wherein, the second separate shaft has a first hole, the third separate shaft has a bias-releasing hole, and, when the telescopic handle is fully retracted, the engaging projection of the first separate shaft engages both the first hole of the second separate shaft and the bias-releasing hole of the third separate shaft.

11. A holding device as set forth in claim 1, wherein at least one of two pairs, which are a pair of a rear end of the first separate shaft and an inside of the cylinder wall of the second separate shaft and a pair of a rear end of the second separate shaft and an inside of the cylinder wall of the third separate shaft, is provided with a flange and a stopper, respectively, to prevent the at least one of the two pairs from being disengaged from each other.

12. A holding device as set forth in claim 11, wherein, in the at least one of the two pairs, the flange is provided with a recess, and the inside of the cylinder wall is provided with a ridge, to prevent the at least one of the two pairs from being rotated in relation to each other.

13. A holding device as set forth in claim 1, wherein the first separate shaft is provided with a front-end-engaging projection integrally formed with the first separate shaft, to which the support member is attached.

14. A holding device for a cleaning wiper comprising:
a telescopic handle having axially opposed front and rear ends and including at least first, second and third separate shafts in front-to-rear order when the telescopic handle is fully extended, each of which shafts having a hollow cylinder, the first separate shaft configured to axially fit in the second separate shaft, and the second shaft configured to axially fit in the third separate shaft; and
a support member provided at the front end of the telescopic handle to attach a cleaning wiper,
wherein each of the first and second separate shafts has an axially extending elastic arm and an engaging projection at a leading end of the elastic arm, and a projecting dimension of the engaging projection of the first separate shaft has a slope gradually decreases toward an edge of the engaging projection and the rear end of the telescopic handle,
wherein each of the second and third separate shafts has a through-hole that passes through a cylinder wall of the shaft, and the engaging projections of the first and second separate shafts each engage the through-holes of the second and third separate shafts, respectively, when the telescopic handle is fully extended,
wherein, when the engaging projection of the first separate shaft engages the through hole of the second separate shaft, the edge of the engaging projection of the first separate shaft is positioned to lie along an engaging edge of and within the through-hole of the second separate shaft,
wherein, when the engaging projection of the second separate shaft, which engages the through-hole of the third separate shaft, is pressed from outside the third separate shaft, the second and third separate shafts are configured so that the engaging projection of the second separate shaft is released from the through-hole of the third separate shaft to have the second separate shaft retracted into the third separate shaft, wherein, as the second separate shaft is retracted into the third separate shaft, the engaging projection of the first separate shaft is configured to be displaced radially inwardly by a contact of the slope with a front end of the third separate shaft, which causes the edge of the engaging projection of the first separate shaft to fall below the engaging edge of the through-hole of the second separate shaft and to allow to be further radially inwardly displaced by a contact of the slope with the engaging edge of the through hole of the second separate shaft so as to come out of the through-hole of the second separate shaft without a need of pressing the engaging projection of the first separate shaft with a finger, and wherein, the second separate shaft has a first hole, the third separate shaft has a bias-releasing hole, and, when the telescopic handle is fully retracted, the engaging projection of the first separate shaft engages both the first hole of the second separate shaft and the bias-releasing hole of the third separate shaft.

15. A holding device as set forth in claim 14, wherein at least one of two pairs, which are a pair of a rear end of the first separate shaft and an inside of the cylinder wall of the second separate shaft and a pair of a rear end of the second separate shaft and an inside of the cylinder wall of the third separate shaft, is provided with a flange and a stopper, respectively, to prevent the at least one of the two pairs from being disengaged from each other.

16. A holding device as set forth in claim 15, wherein, in the at least one of the two pairs, the flange is provided with a recess, and the inside of the cylinder wall is provided with a ridge, to prevent the at least one of the two pairs from being rotated in relation to each other.

17. A holding device as set forth in claim 14, wherein the first separate shaft is provided with a front-end-engaging projection integrally formed with the first separate shaft, to which the support member is attached.

* * * * *